US012615637B2

(12) United States Patent
Uniyal et al.

(10) Patent No.: US 12,615,637 B2
(45) Date of Patent: Apr. 28, 2026

(54) DYNAMIC DETERMINATION OF A PHYSICAL DOWNLINK CONTROL CHANNEL SYMBOL COUNT IN A SUBFRAME FOR A RADIO ACCESS NETWORK

(71) Applicant: DISH Wireless L.L.C., Englewood, CO (US)

(72) Inventors: Manish Uniyal, Parker, CO (US); Karupaiah Rajendran, Sachse, TX (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/631,345

(22) Filed: Apr. 10, 2024

(65) Prior Publication Data

US 2025/0324418 A1 Oct. 16, 2025

(51) Int. Cl.
| | |
|---|---|
| *H04W 72/1273* | (2023.01) |
| *H04W 72/0446* | (2023.01) |
| *H04W 72/52* | (2023.01) |
| *H04W 72/541* | (2023.01) |

(52) U.S. Cl.
CPC ... *H04W 72/1273* (2013.01); *H04W 72/0446* (2013.01); *H04W 72/52* (2023.01); *H04W 72/541* (2023.01)

(58) Field of Classification Search
CPC ......... H04W 72/1273; H04W 72/0446; H04W 72/52; H04W 72/541
See application file for complete search history.

(56) References Cited

U.S. PATENT DOCUMENTS

| | | | |
|---|---|---|---|
| 2008/0273616 A1* | 11/2008 | Papasakellariou .... | H04L 5/0053 375/260 |
| 2010/0091724 A1 | 4/2010 | Ishii et al. | |
| 2012/0127910 A1 | 5/2012 | Li | |
| 2014/0241293 A1* | 8/2014 | Luo ....................... | H04W 28/04 370/329 |

(Continued)

FOREIGN PATENT DOCUMENTS

| | | | |
|---|---|---|---|
| CN | 104144503 A | * | 11/2014 |
| CN | 104144503 B | * | 11/2017 |

OTHER PUBLICATIONS

International search report for International application No. PCT/US2025/022412.

(Continued)

*Primary Examiner* — Noel R Beharry
*Assistant Examiner* — Phillip J Kearns
(74) *Attorney, Agent, or Firm* — Capitol City TechLaw; Jasbir Singh

(57) ABSTRACT

A system and method for managing a Physical Downlink Control Channel (PDCCH) in a Radio Access Network (RAN) involves dynamically determining a PDCCH symbol count in a subframe based on the RAN state, setting the PDCCH symbol count for the subframe accordingly, and transmitting the subframe. The method further includes aligning the determined PDCCH symbol count across a cluster of sites and bands. The PDCCH symbol count is an integer greater than zero and less than four, ensuring efficient and optimized PDCCH management within the RAN environment such as a 4G or 5G cellular RAN.

19 Claims, 5 Drawing Sheets

(56) References Cited

U.S. PATENT DOCUMENTS

| | | | |
|---|---|---|---|
| 2014/0269623 A1* | 9/2014 | Sadek | H04W 52/325 |
| | | | 370/332 |
| 2015/0215837 A1* | 7/2015 | Yiu | H04W 24/10 |
| | | | 370/332 |
| 2015/0263818 A1* | 9/2015 | Guo | H04L 5/0073 |
| | | | 370/329 |
| 2017/0134127 A1* | 5/2017 | Peltola | H04L 5/0092 |
| 2018/0041857 A1* | 2/2018 | Ouchi | H04W 72/12 |
| 2024/0275538 A1* | 8/2024 | Liu | H04W 16/14 |

OTHER PUBLICATIONS

"5G", https://en.wikipedia.org/wiki/5G, printed on Jul. 10, 2025.

* cited by examiner

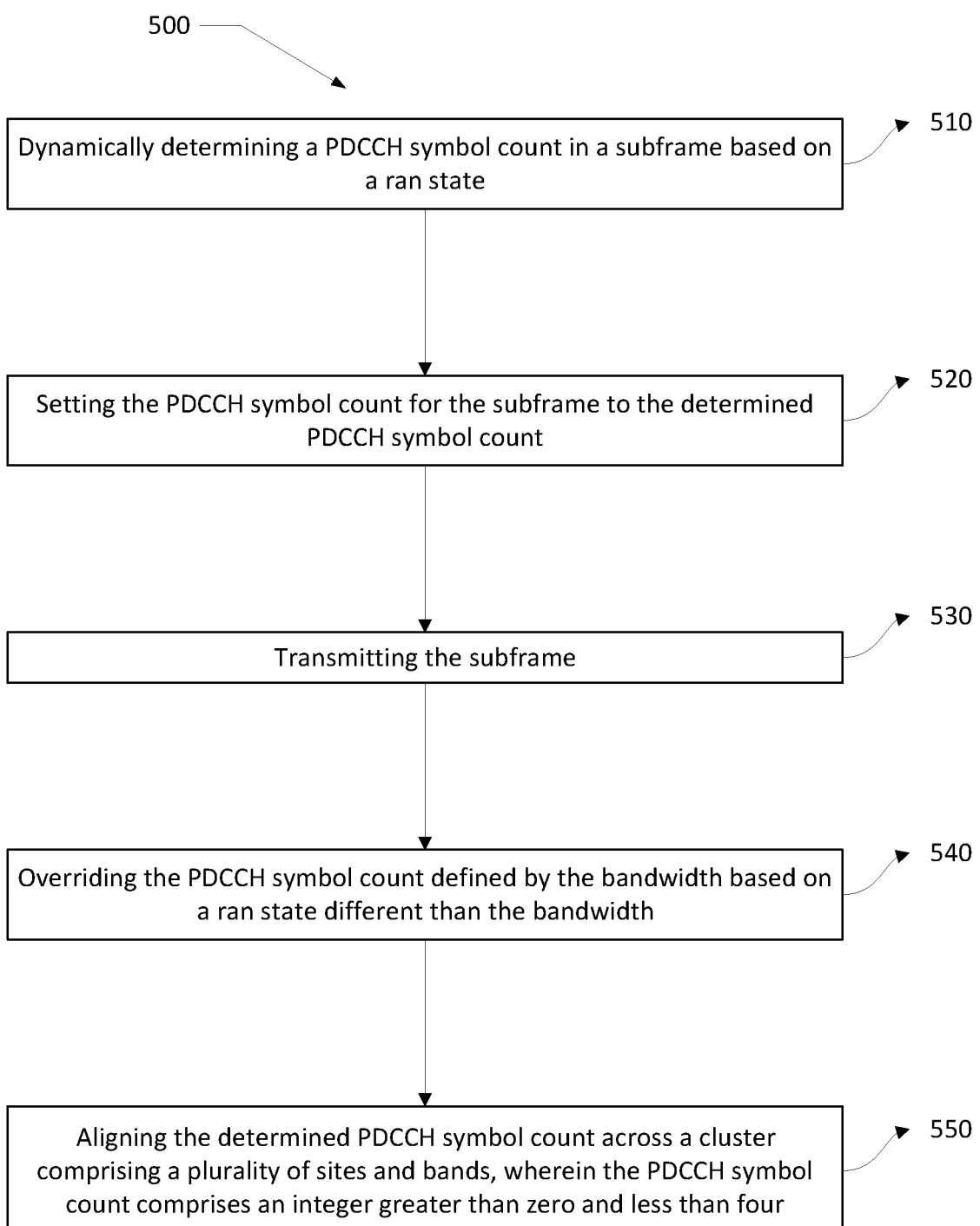

500

Dynamically determining a PDCCH symbol count in a subframe based on a ran state

510

Setting the PDCCH symbol count for the subframe to the determined PDCCH symbol count

520

Transmitting the subframe

530

Overriding the PDCCH symbol count defined by the bandwidth based on a ran state different than the bandwidth

540

Aligning the determined PDCCH symbol count across a cluster comprising a plurality of sites and bands, wherein the PDCCH symbol count comprises an integer greater than zero and less than four

DYNAMIC DETERMINATION OF A PHYSICAL DOWNLINK CONTROL CHANNEL SYMBOL COUNT IN A SUBFRAME FOR A RADIO ACCESS NETWORK

FIELD

The present teachings pertain to the field of Radio Access Networks (RANs), specifically focusing on allocation of Physical Downlink Control Channel (PDCCH) symbols in a subframe. The RAN may be an Open Radio Access Network (O-RAN). The RAN may be cellular network, for example, a Fourth Generation (4G) RAN, a Fifth Generation (5G) RAN or the like.

In the field of wireless communication, the 3rd Generation Partnership Project (3GPP) has defined various slot formats for data transmission. These slot formats consist of a pattern of downlink (D), flexible (F), and uplink (U) symbols in a slot. The allocation of these symbols, particularly the Physical Downlink Control Channel (PDCCH) symbol length, plays a crucial role in the throughput of the network. The PDCCH symbol's length or duration can significantly impact the network's performance. However, the current industry practice may not always provide the optimal performance under different network conditions.

Previous approaches for managing Physical Downlink Control Channels (PDCCH) in Radio Access Networks (RANs) have focused on fixed configurations for PDCCH symbol counts in subframes. These fixed configurations have limited flexibility, they do not adapt to changing RAN states, lead to inefficiencies in resource allocation and potentially suffer from performance degradation. Additionally, existing methods have not adequately addressed the need for aligning PDCCH symbol counts across clusters comprising multiple sites and bands, resulting in suboptimal coordination and interference issues within the network.

In traditional RAN systems, the static approach does not effectively accommodate variations in RAN states, such as changes in traffic load, interference levels, signal-to-noise ratio (SNR) of an RX signal at a target UE, site congestion, and bandwidth of a transmission band. As a result, there is a need for more dynamic and adaptive methods for managing PDCCH symbol counts to enhance network efficiency and performance.

BACKGROUND

Furthermore, existing solutions have not adequately addressed the challenge of aligning PDCCH symbol counts across clusters comprising multiple sites and bands within a 5G RAN. Lack of synchronization and coordination among different network elements can lead to inefficiencies in resource allocation and potential conflicts in signal processing, impacting overall system performance. Therefore, there is a need for an improved method that can dynamically determine and align PDCCH symbol counts across clusters to optimize resource utilization and enhance network reliability. However, none of these approaches have provided a comprehensive solution that combines the features described in this disclosure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings help a RAN deliver a better and improved throughput performance of the network, and a better user experience with additional PDSCH resources available. An overall dynamic PDCCH symbol determination for different bandwidths helps in balancing a multi carrier O-RAN DU/site's resources.

In some aspects, the techniques described herein relate to a computer-implemented method for managing a Physical Downlink Control Channel (PDCCH) in a Radio Access Network (RAN), the method including: dynamically determining a PDCCH symbol count in a subframe based on a RAN state; setting the PDCCH symbol count for the subframe to the determined PDCCH symbol count; and transmitting the subframe, wherein the PDCCH symbol count includes an integer greater than zero and less than four.

In some aspects, the techniques described herein relate to a method, wherein the RAN state includes a downlink Signal to Noise Ratio (SNR) reported by a target User Equipment (UE) of the subframe, and the setting sets the PDCCH symbol count to 1 when the SNR is strong.

In some aspects, the techniques described herein relate to a method, wherein the RAN state includes a congestion state indicates congestion at a site of the RAN and the setting sets the PDCCH symbol count to 1.

In some aspects, the techniques described herein relate to a method, wherein the congestion state indicates congestion when a scheduler for the subframe observes a queuing delay above a threshold delay.

In some aspects, the techniques described herein relate to a method, wherein the RAN state includes a deeply penetrative band and the setting sets the PDCCH symbol count to 1.

In some aspects, the techniques described herein relate to a method, wherein the RAN state includes an indication that target UEs of the subframe are located within a threshold distance from a transmit antenna and the setting sets the PDCCH symbol count to 1.

In some aspects, the techniques described herein relate to a method, wherein the RAN state includes an indication that at least one UE of target UEs of the subframe is located outside a threshold distance from a transmit antenna and the setting sets the PDCCH symbol count to 2.

In some aspects, the techniques described herein relate to a method, wherein the RAN state includes a bandwidth of a transmission band, the setting sets the PDCCH symbol count to 2 when the bandwidth is less than 10 MHZ, and the setting sets the PDCCH symbol count to 1 when the bandwidth is greater than or equal to 10 MHz.

In some aspects, the techniques described herein relate to a method, further including overriding the PDCCH symbol count defined by the bandwidth based on a RAN state different than the bandwidth.

In some aspects, the techniques described herein relate to a method, further including aligning the determined PDCCH symbol count across a cluster including a plurality of sites and bands.

In some aspects, the techniques described herein relate to a system to manage a Physical Downlink Control Channel (PDCCH) in a Radio Access Network (RAN), the system including: a PDCCH module to dynamically determine a PDCCH symbol count in a subframe based on a RAN state, and to set the PDCCH symbol count for the subframe to the determined PDCCH symbol count; and a transmitter to transmit the subframe, wherein the PDCCH symbol count includes an integer greater than zero and less than four.

In some aspects, the techniques described herein relate to a system, wherein the RAN state includes a downlink Signal to Noise Ratio (SNR) reported by a target User Equipment (UE) of the subframe, and the setting sets the PDCCH symbol count to 1 when the SNR is strong.

In some aspects, the techniques described herein relate to a system, wherein the RAN state includes a congestion state indicates congestion at a site of the RAN and the setting sets the PDCCH symbol count to 1.

In some aspects, the techniques described herein relate to a system, wherein the congestion state indicates congestion when a scheduler for the subframe observes a queuing delay above a threshold delay.

In some aspects, the techniques described herein relate to a system, the RAN state includes a deeply penetrative band and the setting sets the PDCCH symbol count to 1.

In some aspects, the techniques described herein relate to a system, wherein the RAN state includes an indication that target UEs of the subframe are located within a threshold distance from a transmit antenna and the setting sets the PDCCH symbol count to 1.

In some aspects, the techniques described herein relate to a system, wherein the RAN state includes an indication that at least UE of target UEs of the subframe is located outside a threshold distance from a transmit antenna and the setting sets the PDCCH symbol count to 2.

In some aspects, the techniques described herein relate to a system, wherein the RAN state includes a bandwidth of a transmission band, the setting sets the PDCCH symbol count to 2 when the bandwidth is less than 10 MHz, and the setting sets the PDCCH symbol count to 1 when the bandwidth is greater than or equal to 10 MHz.

In some aspects, the techniques described herein relate to a system, further including overriding the PDCCH symbol count defined by the bandwidth based on a RAN state different than the bandwidth.

In some aspects, the techniques described herein relate to a system, further including a cluster manager to align the determined PDCCH symbol count across a cluster including a plurality of sites and bands.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 5 illustrates, in a flowchart, operations for managing a Physical Downlink Control Channel in a 5G Radio Access Network, according to various embodiments.

Figure 1:
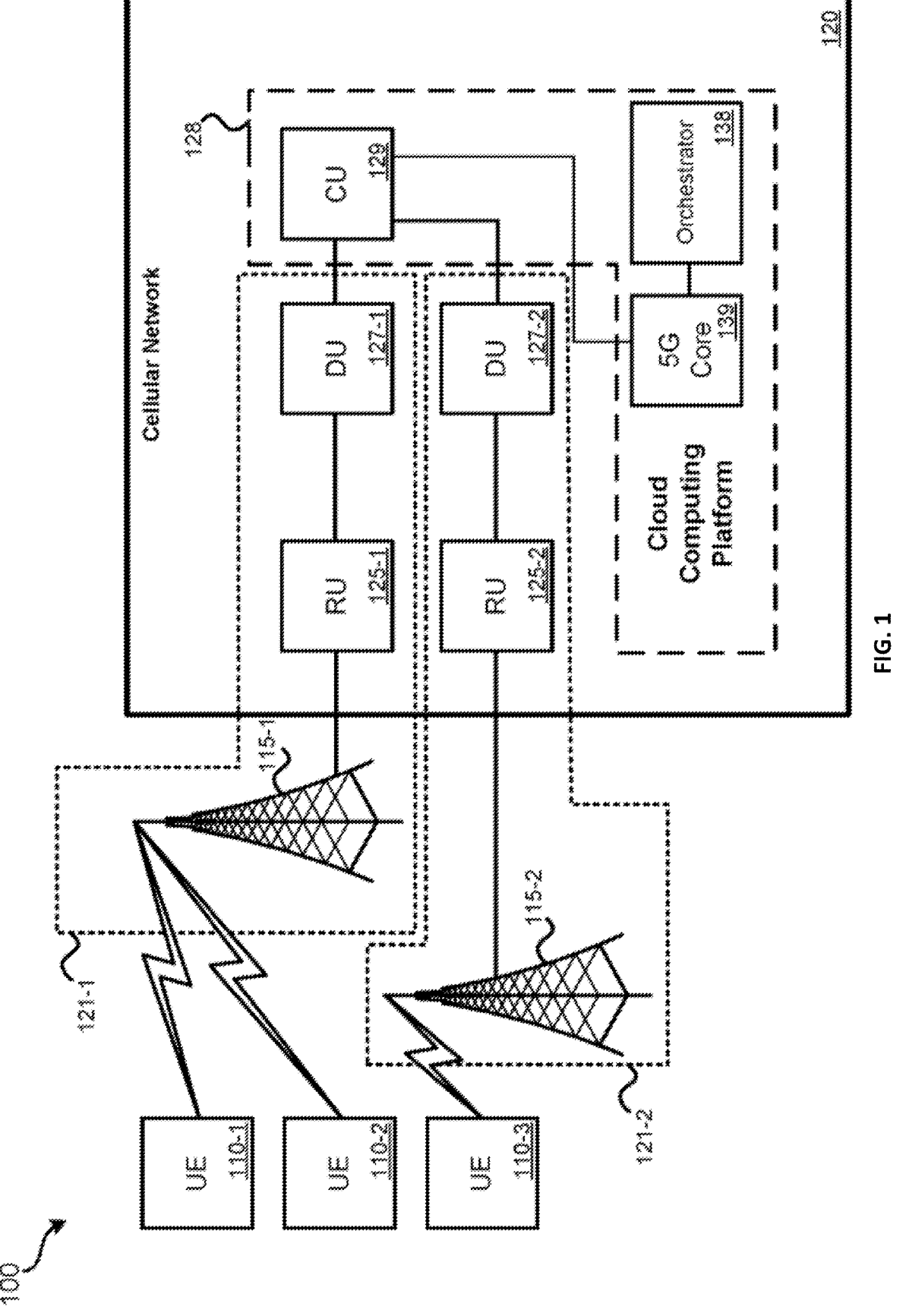
FIG. 1 illustrates an embodiment of a hybrid cloud cellular network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the fore-going. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

FIG. 1 illustrates a block diagram of a hybrid cellular network system ("system 100"). System 100 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an Open Radio Access Network (O-RAN), most components, except for components that need to receive and transmit RF, can be implemented as specialized software executed on general-purpose hardware or servers. For at least some components, the hardware may be maintained by a separate cloud-service computing platform provider. Therefore, the cellular network operator may operate some hardware (such as, RUs and local computing resources on which DUs are executed) connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE 110 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, or the like. Depending on the location of individual UEs, UE 110 may use RF to communicate with various BSs of cellular network 120. BS 121 may include an RU (e.g., RU 125-1) and a DU (e.g., DU 127-1). Two BSs 121 (BS 121-1 and BS 121-2) are illustrated. BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on a cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-based computing platform 128 may have the ability to devote additional hardware resources to cloud-based cellular network components or implement additional instances of such components when requested.

The deployment, scaling, and management of such virtualized components can be managed by orchestrator 138.

Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g. helm charts), creating Kubernetes nodes/pods, loading DU containers, configuring the DU, and activating other support functions (e.g. Prometheus, instances/connections to test tools). While this instantiation of a DU may be triggered by orchestrator 138, a chaos test system may introduce false DU container images in the repo, may introduce latency or memory issues in Kubernetes, may vary traffic messaging, and/or create other "chaos" in order to conduct the test. That is, chaos test system is not only connected to a DU, but is connected to all the layers and systems above and below a DU, as an example.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The traditional OSS/BSS stack exists above orchestrator 138. Chaos testing of these components, as well as other higher layer custom-built components. Such components can be required sources of information and agents for testing at the service/app/solution layer. One aim of chaos testing is to verify the business intent (service level objectives (SLOs) and SLAs) of the solution. Therefore, if we commit to a SLA with certain key performance indicators (KPIs), chaos testing can allow measuring of whether those KPIs are being met and assess resiliency of the system across all layers to meeting them.

A cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
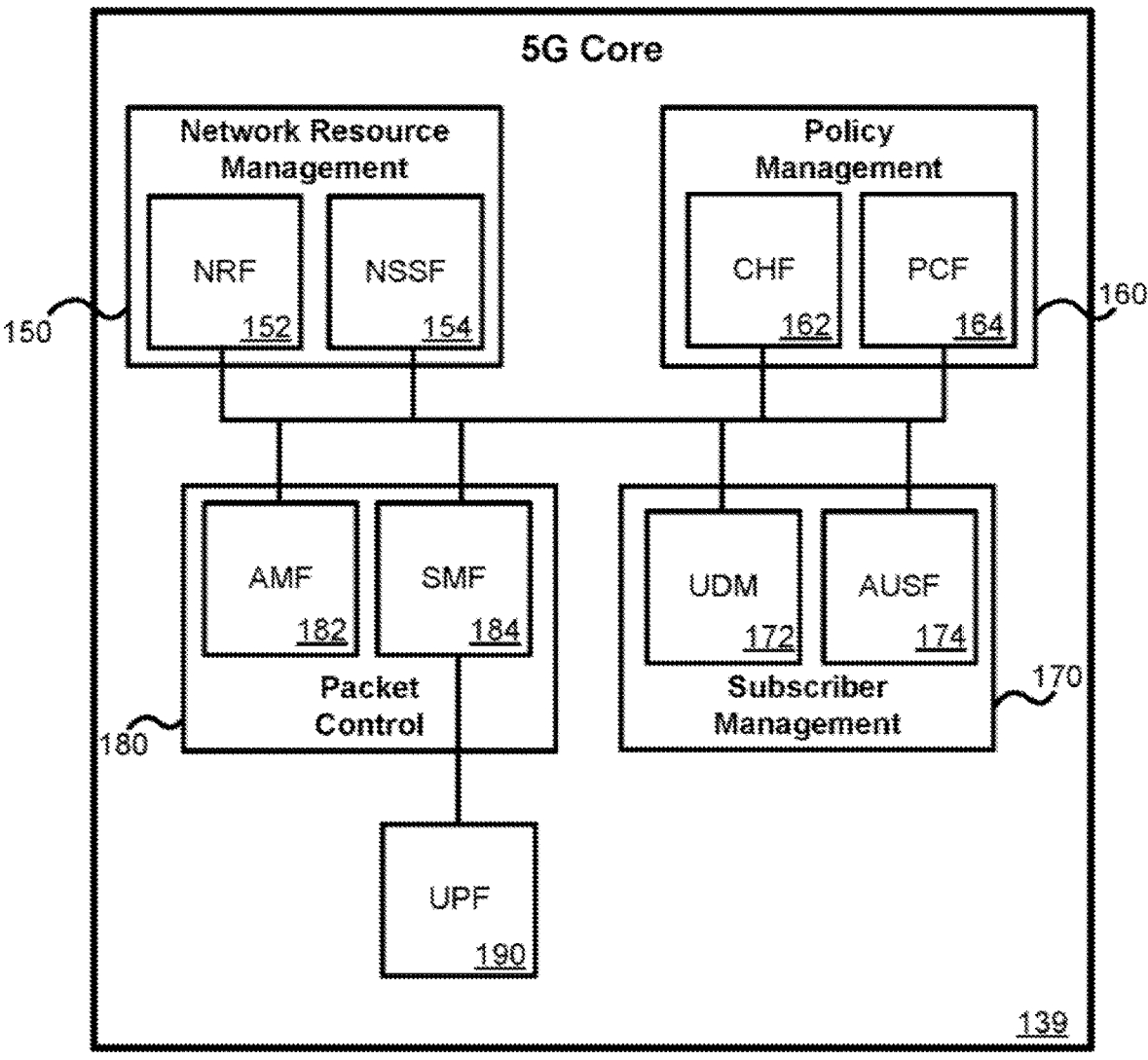
FIG. 2 illustrates an embodiment of a 5G Core.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
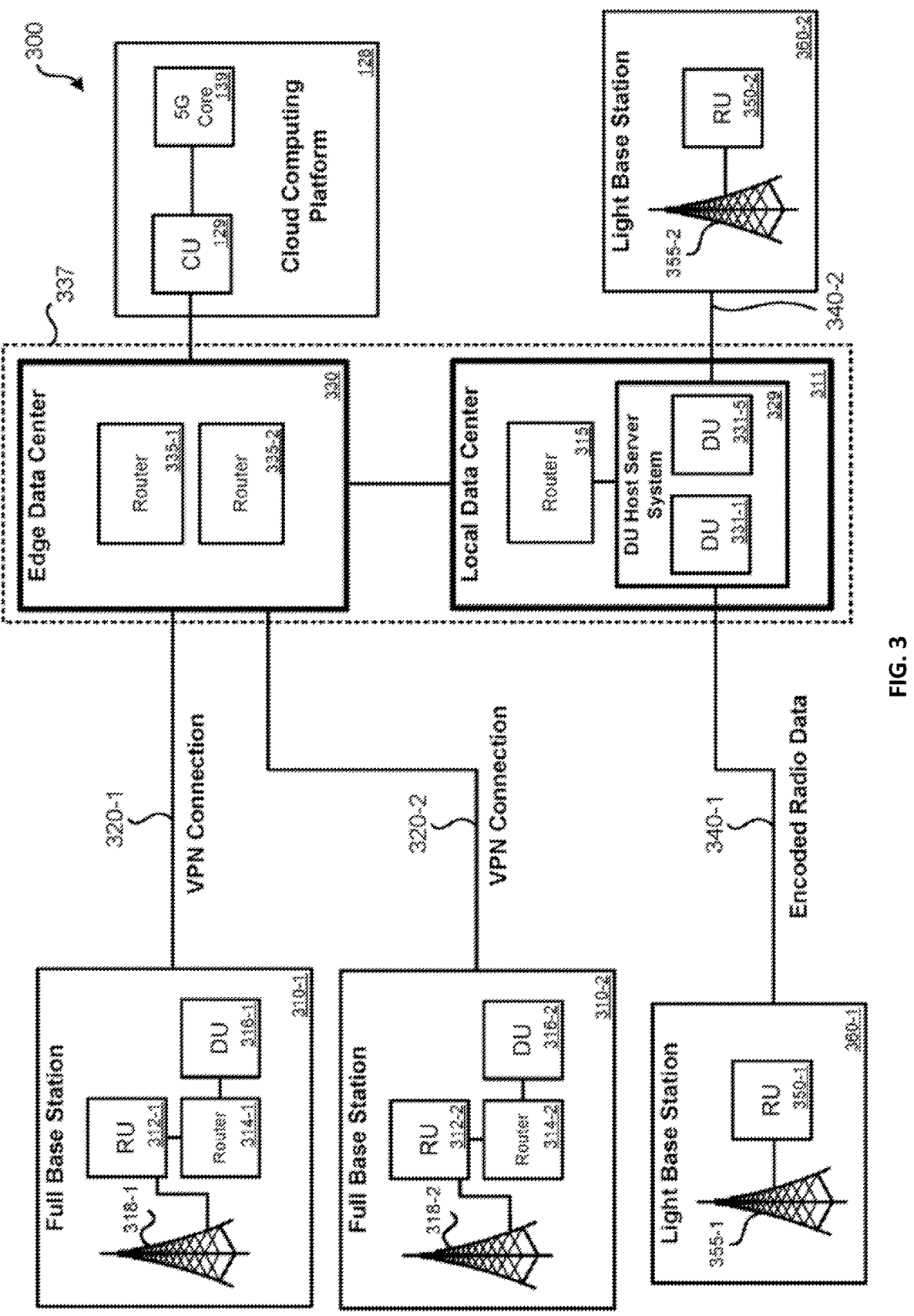
FIG. 3 illustrates an embodiment of a hybrid cloud cellular network architecture.

FIG. 3 illustrates an embodiment of hybrid cellular network system 300 ("system 300") that includes hybrid use of local and remote DUs in communication with a cloud computing platform that hosts the cellular network core. System 300 can include: LDC 311; light BSs 360; full BSs 310; VLAN connections 320; edge data center 330 ("EDC 230"); CU 129; and 5G core 139, which are executed on cloud computing platform 128. In system 300, some base stations, referred to as "full base stations," have DUs implemented locally at each BS. In contrast, a "light base station" includes structure (e.g., structures 355) and a local radio unit (e.g., RUs 350), but a DU implemented remotely at a geographically separated LDC. In system 300, either light BSs 360 or full BSs 310 may be referred to as a cell site.

LDC 311 can serve to host DU host server system 329, which can host multiple DUs 331 which are remote from corresponding light base stations 360. For example, DU 331-1 can perform the DU functionality for light base station 360-1. DUs with DU host server system 329 can communicate with each other as needed.

LDC 311 can be connected with EDC 330. In some embodiments, LDC 370 and EDC 330 may be co-located in a same data center or are relatively near each other, such as within 250 meters. EDC 330 can include multiple routers, such as routers 335, and can serve as a hub for multiple full BSs 310 and one or more LDCs 311. EDC 330 may be so named because it primarily handles the routing of data and does not host any RAN or cellular core functions. In a cloud-computing cellular network implementation at least some components, such as CU 129 and functions of 5G core 139, may be hosted on cloud computing platform 128. EDC 330 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 330.

Full BSs 310, which include on-site DUs 316, may connect with the cellular network through EDC 330. A full BS, such as full BS 310-1, can include: RU 312-1; router 314-1; DU 316-1; and structure 318-1. Router 314-1 may have a connection to a high bandwidth communication link with EDC 330. Router 314-1 may route data between DU 316-1 and EDC 330 and between DU 316-1 and RU 312-1. In some embodiments, RU 312-1 and one or more antennas are mounted to structure 318-1, while router 314-1 and DU 316-1 are housed at a base of structure 318-1. Full BS 310-2 functions similarly to full BS 310-1. While two full BSs 310 and two light BSs 360 are illustrated in FIG. 3, it should be understood that these numbers of BSs are merely for exemplary purposes; in other embodiments, the number of each type of BS may be greater or fewer.

While encoded radio data is transmitted via the fiber optic connections 340 between light BSs 360 and LDC 370, connection 320-1 between full BSs 310 and EDC 330 may occur over a fiber network. For example, while the connection between light BS 360-1 and LDC 370 can be understood as a dedicated point-to-point communication link on which addressing is not necessary, full BS 310-1 may operate on a fiber network on which addressing is required. Multiprotocol label switching (MPLS) segment routing (SR) may be used to perform routing over a network (e.g., fiber optic network) between full BS 310-1 and EDC 330. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 310-1. While MPLS SR can be used for the network connection between full BSs 310 and EDC 330, it should be understood that other protocols and non-fiber-based networks can be used for connections 320.

For communications across connection 320-1, a virtual local area network (VLAN) may be established between DU 316-1 and EDC 330, when a fiber network that may also be used by other entities is used. The encryption of this VLAN helps ensure the security of the data transmitted over the fiber network.

Since light BSs 360 are relatively close to LDC 370, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 310 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 337, thus requiring a dedicated fiber optic connection to satisfy the bandwidth requirements of light BSs.

To perform chaos testing, a small portion of the cellular network can be simulated and tested, followed by larger portions of the cellular network as needed to verify functionality and robustness. Once satisfied as to performance in a test environment, testing can be performed in a restricted production environment, followed by release into the general production environment. On each of these levels, some amount of chaos testing can be performed.

Improvements

In a 5G Open Radio Access Network (O-RAN), the PDCCH is primarily used to carry scheduling information to individual UEs, i.e., resource assignments for uplink and downlink data and control information. A count of a subframe's symbols used for PDCCH affects the downlink capacity. When the PDCCH occupies a larger number of symbols in a subframe, the downlink capacity is lowered and vice-versa. In 5G, the PDCCH symbol can use up to 3 symbols (apart from BW 1.4 MHz where it can go up to 4 and is applicable to Long Term Evolution (LTE) only). In 5G, each subframe has 14 symbols so when a PDCCH uses 3 symbols, the subframe's payload (the Physical Downlink Shared Channel (PDSCH) will only be able to use 11 symbols. The PDCCH is used to give scheduling allocations to a User Equipment (UE) on the PDSCH or Physical Uplink Shared Channel (PUSCH). The PDCCH informs the UE of its data location in the PDSCH. When a count of the PDCCH symbols is reduced then available PDSCH resources can increase leading to more data per subframe and thus more throughput.

In some embodiments, the PDCCH symbol count is based on a bandwidth of the different 5G available bands in the O-RAN network. A RAN may have different bands at available at differing sites with each of the different bands possibly different bandwidths. For example, the PDCCH symbol count may be dynamically set to 2 symbols when the bandwidth of a respective band is less than 10 MHz, and set to 1 symbol when the bandwidth of the respective band is greater than or equal to 10 MHz.

In some embodiments, the PDCCH symbol count may be dynamically determined based on SNRs (Signal to Noise Ratio) reported by the target UEs. For example, when the target UEs report a strong SNR (for example, greater than 5 dB), the PDCCH symbol count may be set to 1, set to 2 for a medium SNR (for example, between 0 and 5 dB), and set to 3 for a low SNR (for example, less than 0 dB).

In some embodiments, when a RAN site reports congestion, the PDCCH symbol count may be set to 1.

In some embodiments, a metric may express whether a target band is deeply penetrative. For deeply penetrative bands, the PDCCH symbol count may be set to 1.

The metrics may determine the PDCCH symbol count singularly or in combination. Some of the metrics may override other consideration. For example, the congestion metric may override the PDCCH symbol count defined by a band's bandwidth. In such a case, the method may reduce the PDCCH symbol count to 1 even for a band having a bandwidth less than 10 MHz.

In some embodiments, a setting of the PDCCH symbol count per the method may be tested by comparing a pre and post throughput for a cluster. Reducing the PDCCH symbol improves the throughput as more PDSCH symbols are available for allocation and thus more data may be conveyed per subframe. Theoretically, reducing 1 PDCCH symbol as shown in slot format of FIG. 4 yields greater than 7% throughput improvement.

Figures 4, 6:
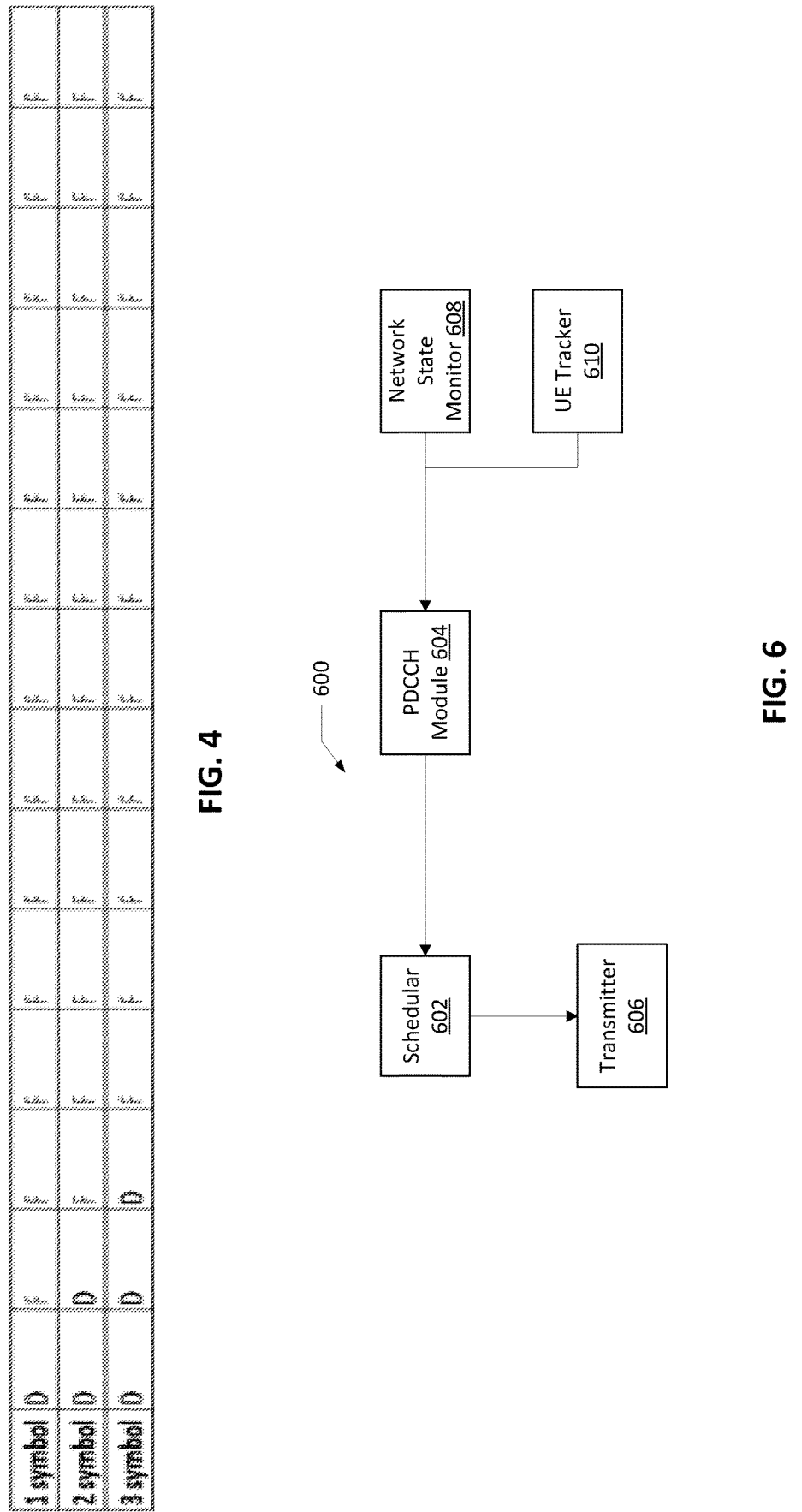
FIG. 4 illustrates three slot formats according to various embodiments.
FIG. 6 illustrates a PDCCH Management System, according to various embodiments.

FIG. 4 illustrates three slot formats according to various embodiments.

3GPP release 17 TS 38.213 predefines 56 slot formats (Table 11.1.1-1), each slot format having a pattern of downlink (D)/flexible (F)/uplink (U) symbols in a a slot. The slot formats of FIG. 4 are exemplary predefined slots options that were used to verify the present teachings and illustrate the flexibility of allocating dynamic PDCCH symbols. Theoretically, changing a PDCCH symbol's duration from 2 to 1 results in greater than 7% increase in throughput values as the now extra PDSCH symbol can be allocated for downlink or uplink. Moreover, a 10% throughput increase was realized for cluster level KPIs (a group of sites is called a cluster) after aligning the PDCCH symbol duration across the cluster sites and all bands.

FIG. 5 illustrates, in a flowchart, operations for managing a Physical Downlink Control Channel in a 5G Radio Access Network, according to various embodiments.

FIG. 5 is a flowchart of an example method 500 for managing a Physical Downlink Control Channel (PDCCH) in a Fifth Generation (5G) Radio Access Network (RAN).

At operation 510, the method 500 includes dynamically determining a PDCCH symbol count in a subframe based on a RAN state]

Operation 510 may perform an evaluation of RAN states to adjust the PDCCH symbol count. The symbol count is a numerical value that dictates the number of symbols dedicated to PDCCH within a subframe. Adjusting this count can affect the allocation of resources for downlink and uplink communication, potentially leading to an increase in data throughput. The RAN evaluation begins with a software command or trigger within the 5G core 139 or at RUs 125. This evaluation ensures that the symbol count is set in a manner that is responsive to the current network conditions. The evaluation may be a preparatory step that does not involve the actual determination or setting of the symbol count but rather starts the sequence of operations that will lead to these adjustments.

Operation 510 subsequently allows for an increased or decreased number of PDSCH symbols, directly influencing network throughput. The actions within this operation include analyzing various metrics that define the RAN state. Exemplary metrics include a downlink Signal to Noise Ratio (SNR) reported by target User Equipment (UE), congestion at a RAN site, characteristics of deeply penetrative bands, the bandwidth of the transmission band and the like. Each metric influences the determination of the PDCCH symbol count, which is set to an integer value within a specified range.

For example, if the RAN state indicates a strong downlink SNR reported by the target UE, the PDCCH symbol count may be set to a lower value to maximize throughput. Similarly, if there is congestion at the RAN site, as indicated by a scheduler observing a queuing delay above a certain threshold, the PDCCH symbol count may be set to a lower value to help alleviate congestion. Likewise, for bands with better propagation characteristics, the PDCCH symbol count may be set to a lower value. The bandwidth of the transmission band plays a role, with the PDCCH symbol count set to a higher value for narrower bandwidths and to a lower value for wider bandwidths. Moreover, certain metrics, such as congestion, may take precedence over others like bandwidth when determining the PDCCH symbol count.

Operation 510 may be performed by a PDCCH module within the RUs or 5G core processing data reported by UEs or measured by network equipment. Based on this data, the module adjusts the PDCCH symbol count for upcoming subframes to optimize network performance. This adjustment is data-driven and responsive to the current network state, ensuring that the PDCCH configuration is continually optimized for the prevailing conditions.

Operation 510 may determine the PDCCH symbol count for a subframe based on previously determined parameters related to the RAN state. The PDCCH symbol count manages the allocation of PDCCH and PDSCH (by inference as a count of symbols in a subframe is fixed) symbols within a subframe, which directly affects the data throughput of the network.

At operation 520, the method 500 includes setting the PDCCH symbol count for the subframe to the determined PDCCH symbol count. By setting the PDCCH symbol count, an adjustment to performance of the RAN can be made. The adjustment of the PDCCH symbol count is a deliberate action that aims to balance the requirements for control signaling with the capacity for downlink data transmission. By optimizing this balance, the network can enhance performance, leading to improved user experiences and more efficient use of network resources.

At operation 530, the method 500 includes transmitting a subframe in a 5G Radio Access Network (RAN) after the Physical Downlink Control Channel (PDCCH) symbol count has been configured based on various RAN states. The subframe is a defined time interval used for data transmission over the air interface in cellular networks, which includes both control information and user data. The PDCCH symbol count, determined in previous operations, specifies the number of symbols within the subframe allocated for control information. Adjusting this count allows for an increase in the capacity for user data by potentially allocating more symbols to the Physical Downlink Shared Channel (PDSCH).

The transmission of the subframe is executed by the RUs responsible for managing the PDCCH and orchestrating the data delivery to the User Equipment (UE). The RUs utilize the available spectrum efficiently and provide an enhanced data delivery experience. The UE is the recipient of the downlink data contained within the subframe.

At operation 540, the method 500 includes overriding the PDCCH symbol count defined by the bandwidth based on a RAN state different than the bandwidth. For example, certain metrics, such as congestion, may take precedence over others like bandwidth when determining the PDCCH symbol count.

At operation 550, the method 500 includes aligning the determined PDCCH symbol count across a cluster comprising a plurality of sites and bands. By standardizing the PDCCH symbol count across a network cluster that includes multiple sites and frequency bands. This operation is taken after the PDCCH symbol count has been determined based on various RAN states, which could include factors such as downlink SNR, congestion levels, band penetration, and bandwidth of transmission bands (referenced in operation 510).

A uniform application of the PDCCH symbol count is aimed at achieving consistent network performance and resource management throughout the cluster. This can lead to an increase in network throughput. By aligning the symbol count, the network can potentially utilize the additional PDSCH symbols that become available when the PDCCH symbol duration is reduced. In summary, operation 550 may be the final action in a sequence that begins with the determination of the PDCCH symbol count and ends with the application of this configuration across a cluster to harmonize the network's operation and optimize performance.

FIG. 6 illustrates a PDCCH Management System, according to various embodiments.

FIG. 6 illustrates a PDCCH Management System 600. PDCCH Management System 600 may work with a schedular 602 that manages the allocation of downlink and uplink resources to enhance network throughput. The PDCCH Management System 600 includes a PDCCH module 604 to dynamically determine the PDCCH symbol count that sets or adjusts the allocation of a PDCCH symbol count in a subframe. A transmitter 606 is responsible for the transmission of subframes, which contain the PDCCH symbols. A RAN State Monitor 608 assesses and evaluate the RAN state to inform the PDCCH module 604 when determining a PDCCH symbol count. The PDCCH module 604 informs the schedular 602 of the determined PDCCH symbol count for one or more subframes.

The PDCCH modulate determines and calculates the symbol count for PDCCH within a subframe based on RAN conditions such as signal quality, congestion, and bandwidth. The schedular 602 ensures that adjustments to the PDCCH symbol count contribute to network performance. The RAN State Monitor 608 provides inputs for symbol count determination by monitoring downlink Signal to Noise Ratio (SNR), site congestion levels, transmission band bandwidth and the like.

The Transmitter 606 transmits the subframe with the adjusted PDCCH symbol count to user equipment. This transmission ensures that the symbol count adjustments lead to improved network performance. Through the interaction of these components, the PDCCH Management System 600 ensures efficient operation of the 5G RAN, delivering high throughput and user experience.

When the SNR reported by User Equipment (UE) is strong, the PDCCH module 604 reduces the symbol count to one. This reduction is based on the high-quality signal conditions to minimize control overhead and maximize the allocation of symbols for data transmission, which in turn enhances the downlink throughput.

In situations where the RAN site is congested, the PDCCH module 604 adjusts the symbol count to one to alleviate congestion by increasing the efficiency of data transmission. This adjustment helps in reducing queuing delays and improving network performance.

For transmission bands with a bandwidth greater than or equal to 10 MHz, the PDCCH module 604 sets the symbol count to one, taking advantage of the wider bandwidth to increase data rates. For bands with less than 10 MHz bandwidth, the symbol count is set to two to ensure robust control signaling in narrower bands.

These adjustments by the PDCCH module 604 may be made in near real-time, responding to changing RAN conditions to optimize network performance and user experience.

The schedular 602 orchestrates the operations of a 5G Radio Access Network, focusing on efficient communication and resource management. This controller is responsible for overseeing the dynamic allocation of Physical Downlink Control Channel (PDCCH) symbols, optimizing network throughput and user experience.

The PDCCH module 604 manages the PDCCH within a 5G Radio Access Network by dynamically determining the number of symbols dedicated to PDCCH within a subframe. This process is influenced by various states of the RAN, such as bandwidth, congestion, and signal quality. When a strong downlink Signal to Noise Ratio (SNR) is reported by User Equipment (UE), the PDCCH module 604 adjusts the PDCCH symbol count to one, allowing for additional Physical Downlink Shared Channel (PDSCH) symbols to be used for data transmission, thus enhancing network throughput.

In situations of network congestion, indicated for example by queuing delays that exceed a set threshold, the PDCCH module 604 reduces the PDCCH symbols to one to alleviate congestion by increasing the availability of PDSCH symbols for data transmission. Additionally, the PDCCH module 604 modifies the PDCCH symbol count based on the bandwidth of the transmission band, setting the count to two symbols for bands with less than 10 MHz bandwidth and to one symbol for bands with bandwidth equal to or greater than 10 MHz. This adjustment balances the control and data channel resources based on the available spectrum.

The PDCCH module 604 may also override the symbol count settings based on bandwidth if other RAN states, such as congestion, necessitate a different configuration to maintain network performance. Furthermore, the PDCCH module 604 ensures the PDCCH symbol count is consistent across multiple sites and bands within a cluster, facilitating uniform performance and user experience across the network.

The transmitter 606 transmits the subframes. Subframes are the structures used for the time division of data in the communication process between the network and user equipment. The transmitter 606 works in conjunction with the PDCCH module 604 and the RAN State Monitor 608.

The RAN State Monitor 608 plays a role in optimizing the Physical Downlink Control Channel (PDCCH) by assessing the Radio Access Network (RAN) state, influencing the allocation of PDCCH symbols to enhance network throughput. It evaluates and assesses the RAN state. The RAN State Monitor 608 may inform the PDCCH module 604 to override the symbol count decision based on bandwidth if other RAN state indicators suggest a different configuration would be more beneficial, ensuring the system's adaptability to varying network conditions. This approach to PDCCH symbol allocation enables the 5G RAN to dynamically optimize its performance, catering to the changing demands of the network and its users.

Data from UE Tracker 610 may be used to adjust symbol counts based on the proximity of user equipment to a transmitting antenna. It considers the location of target user equipment relative to the transmitting antenna, influencing the allocation of PDCCH symbols and thereby affecting data throughput. This assessment informs the optimal PDCCH symbol count, which directly influences the efficiency of downlink data transmission. When the system identifies that the UE is within a predefined proximity to the antenna, the PDCCH module 604 sets the PDCCH symbol count to a lower value, typically one symbol. This adjustment allows for more data symbols (PDSCH) within the subframe, leading to enhanced throughput. When the UE is located beyond the threshold distance, the PDCCH module 604 increases the PDCCH symbol count, usually to two symbols, to ensure reliable communication as the signal quality degrades with distance. The UE Tracker 610 operates under various network conditions, dynamically informing the PDCCH symbol count in real-time to adapt to changing UE locations and maintain network performance. The method involves continuous monitoring of UE locations and applying predefined criteria to determine the symbol count, optimizing the allocation of network resources.

The schedular 602 may identify congestion at a site when network traffic approaches or exceeds the capacity of the site, potentially leading to increased latency and reduced service quality for users. In some embodiments, the schedular 602 analyzes queuing delay data against a predefined threshold. When the queuing delay exceeds this threshold, the schedular 602 signals that there is congestion. This information is used to adjust the Physical Downlink Control Channel (PDCCH) symbol count. This adjustment is made to optimize the allocation of network resources, potentially increasing throughput and improving network performance.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A computer-implemented method for managing a Physical Downlink Control Channel (PDCCH) in a Radio Access Network (RAN), the method comprising:

dynamically determining a PDCCH symbol count in a subframe based on a RAN state of a target User Equipment (UE);

setting the PDCCH symbol count for the subframe to the determined PDCCH symbol count;

transmitting the subframe, wherein the PDCCH symbol count comprises an integer greater than zero and less than four, and the setting responds in near real-time to changes in the RAN state; and aligning the determined PDCCH symbol count across a cluster comprising a plurality of sites and bands.

2. The method of claim 1, wherein the RAN state comprises a downlink Signal to Noise Ratio (SNR) reported by the target UE of the subframe, and the setting sets the PDCCH symbol count to 1 when the SNR is strong.

3. The method of claim 1, wherein the RAN state comprises a congestion state that indicates congestion at a site of the RAN and the setting sets the PDCCH symbol count to 1.

4. The method of claim 1, wherein the RAN state comprises a deeply penetrative band and the setting sets the PDCCH symbol count to 1.

5. The method of claim 1, wherein the RAN state comprises an indication that target UEs of the subframe are located within a threshold distance from a transmit antenna and the setting sets the PDCCH symbol count to 1.

6. The method of claim 1, wherein the RAN state comprises an indication that at least one UE of target UEs of the subframe is located outside a threshold distance from a transmit antenna and the setting sets the PDCCH symbol count to 2.

7. The method of claim 1, wherein the RAN state comprises a bandwidth of a transmission band, the setting sets the PDCCH symbol count to 2 when the bandwidth is less than 10 MHz, and the setting sets the PDCCH symbol count to 1 when the bandwidth is greater than or equal to 10 MHz.

8. The method of claim 7, further comprising overriding the PDCCH symbol count defined by the bandwidth based on a RAN state different than the bandwidth.

9. A computer-implemented method for managing a Physical Downlink Control Channel (PDCCH) in a Radio Access Network (RAN), the method comprising:

dynamically determining a PDCCH symbol count in a subframe based on a RAN state of a target User Equipment (UE);

setting the PDCCH symbol count for the subframe to the determined PDCCH symbol count; and transmitting the subframe, wherein the PDCCH symbol count comprises an integer greater than zero and less than four, and the setting responds in near real-time to changes in the RAN state;

wherein the RAN state comprises a congestion state that indicates congestion at a site of the RAN and the setting sets the PDCCH symbol count to 1; and wherein the congestion state indicates congestion when a scheduler for the subframe observes a queuing delay above a threshold delay.

10. A system to manage a Physical Downlink Control Channel (PDCCH) in a Radio Access Network (RAN), the system comprising:

a PDCCH module to dynamically determine a PDCCH symbol count in a subframe based on a RAN state of a target User Equipment (UE), and to set the PDCCH symbol count for the subframe to the determined PDCCH symbol count; and a transmitter to transmit the subframe, wherein the PDCCH symbol count comprises an integer greater than zero and less than four, and the PDCCH module responds in near real-time to changes in the RAN state; and wherein the RAN state comprises a bandwidth of a transmission band, the setting sets the PDCCH symbol count to 2 when the bandwidth is less than 10 MHz, and the setting sets the PDCCH symbol count to 1 when the bandwidth is greater than or equal to 10 MHz.

11. The system of claim 10, wherein the RAN state comprises a downlink Signal to Noise Ratio (SNR) reported by the target UE of the subframe, and the setting sets the PDCCH symbol count to 1 when the SNR is strong.

12. The system of claim 10, wherein the RAN state comprises a congestion state that indicates congestion at a site of the RAN and the setting sets the PDCCH symbol count to 1.

13. The system of claim 12, wherein the congestion state indicates congestion when a scheduler for the subframe observes a queuing delay above a threshold delay.

14. The system of claim 10, wherein the RAN state comprises a deeply penetrative band and the setting sets the PDCCH symbol count to 1.

15. The system of claim 10, wherein the RAN state comprises an indication that target UEs of the subframe are located within a threshold distance from a transmit antenna and the setting sets the PDCCH symbol count to 1.

16. The system of claim 10, wherein the RAN state comprises an indication that at least one UE of target UEs of the subframe is located outside a threshold distance from a transmit antenna and the setting sets the PDCCH symbol count to 2.

17. The system of claim 10, further comprising overriding the PDCCH symbol count defined by the bandwidth based on a RAN state different than the bandwidth.

18. The system of claim 10, further comprising a cluster manager to align the determined PDCCH symbol count across a cluster comprising a plurality of sites and bands.

19. The method of claim 1, wherein the determining adapts to a changing location of the target UE.

* * * * *